United States Patent
Ishizaki et al.

(10) Patent No.: US 8,003,186 B2
(45) Date of Patent: Aug. 23, 2011

(54) PREFORM FOR OPTICAL ELEMENT AND OPTICAL ELEMENT

(75) Inventors: Futoshi Ishizaki, Kanagawa (JP); Shigeki Fukuda, Kanagawa (JP); Kenji Sugizaki, Kanagawa (JP)

(73) Assignee: Ohara Inc., Sagamihara-shi, Kanagawa (JP)

( * ) Notice: Subject to any disclaimer, the term of this patent is extended or adjusted under 35 U.S.C. 154(b) by 261 days.

(21) Appl. No.: 11/792,751

(22) PCT Filed: Dec. 9, 2005

(86) PCT No.: PCT/JP2005/023087
§ 371 (c)(1),
(2), (4) Date: Aug. 7, 2007

(87) PCT Pub. No.: WO2006/064888
PCT Pub. Date: Jun. 22, 2006

(65) Prior Publication Data
US 2008/0081206 A1    Apr. 3, 2008

(30) Foreign Application Priority Data

Dec. 13, 2004   (JP) .................. 2004-359591
Feb. 23, 2005   (JP) .................. 2005-047276
Jun. 28, 2005   (JP) .................. 2005-187810

(51) Int. Cl.
*C03B 11/08*   (2006.01)
*G02B 1/00*    (2006.01)
*G02B 3/00*    (2006.01)

(52) U.S. Cl. ....... 428/64.1; 351/159; 351/168; 351/169; 351/177; 351/178; 428/542.8

(58) Field of Classification Search .............. 428/64.1, 428/542.8; 351/159, 168, 169, 177, 178
See application file for complete search history.

(56) References Cited

U.S. PATENT DOCUMENTS
4,591,373 A    5/1986  Sato
(Continued)

FOREIGN PATENT DOCUMENTS
EP    0 506 131 A2    9/1992
(Continued)

OTHER PUBLICATIONS
English translation of JP 09012318 A (Miyazaki et al.), see above.*

*Primary Examiner* — Brent O'Hern
(74) *Attorney, Agent, or Firm* — Hoffmann & Baron, LLP

(57) ABSTRACT

A preform for an optical element is provided which involves less amount of deformation of glass in molding, and readily improves lifetime of the mold. The present preform for molding an optical glass element 10 exhibits an almost circular shape having a predetermined diameter in top view, exhibits a flattened semicircular shape having a predetermined overall height in side view, has a concave face on the top surface such that the predetermined overall height is attained at approximately the central position of the aforementioned circular shape, and has a concave face so as to fit along the convex face of the top surface such that a space is provided on the bottom face. The under surface may be either a concave face or a convex face. Also, the top surface may be either a concave face or a convex face.

4 Claims, 6 Drawing Sheets

$t = D \times (0.2 \sim 0.9)$
$\Delta h = D \times (0.02 \sim 0.9)$
$h = D \times (0.2 \sim 0.9)$

U.S. PATENT DOCUMENTS

2004/0066487 A1 * 4/2004 Chansavoir et al. .......... 351/159

FOREIGN PATENT DOCUMENTS

| | | |
|---|---|---|
| FR | 2690434 | 10/1993 |
| JP | 03-146427 | 6/1991 |
| JP | 4012034 | 1/1992 |
| JP | 05-213622 | 8/1993 |
| JP | 5201735 | 8/1993 |
| JP | 5301723 | 11/1993 |
| JP | 09-012318 | 6/1995 |
| JP | 7165431 | 6/1995 |
| JP | 08-165122 | 6/1996 |
| JP | 09012318 A * | 1/1997 |
| JP | 2001-158627 | 6/2001 |
| JP | 2002-234738 | 8/2002 |

* cited by examiner

PREFORM FOR OPTICAL ELEMENT AND OPTICAL ELEMENT

This application is based on and claims the benefit of priority from Japanese Patent Application No. 2004-359591, filed on 13 Dec. 2004, Japanese Patent Application No. 2005-047276, filed on 23 Feb. 2005, and Japanese Patent Application No. 2005-187810, filed on 28 Jun. 2005, the content of which are incorporated herein by reference.

TECHNICAL FIELD

The present invention relates to a preform for an optical element for molding optical elements such as lenses and the like used in optical equipment, and to a method for manufacturing the same.

BACKGROUND ART

In recent years, optical lenses molded to have a predetermined shape have been used as lenses for digital cameras and the like, and concave lenses as well as biconcave lenses have become common optical components. In light of precise and large-scale manufacture of these optical lenses, methods in which a preliminary molding is produced first by molding a molten glass material to have a shape as approximate as possible to the shape of the final optical element, and the preliminary molding is supplied to a final mold and subjected to hot working have been generally employed.

According to this method, reduction in amount of deformation of the optical glass in hot working, and shortening of contact time with the mold may be achieved, thereby resulting in decrease in defective molding and prolongation of lifetime of the mold. In addition, effects of shortening of molding tact time may be expected.

Thus; methods of manufacturing an optical element in which preliminary molding is conducted once have been disclosed in various documents. However, there do not exist many which refer to the shape of the preliminary molding.

On the other hand, a glass preliminary molding having a particular shape has been disclosed (for example, Japanese Patent Application First Publication No. H05-213622). In this document, a glass member previously cut to have a predetermined size is placed on a supporting member having a circular opening, and is once heated for softening to approximate to the catenary curve. Disclosed is a method of obtaining a glass preliminary molding having a biconcave face by further placing this glass member approximated to the catenary curve in a mold with the upper and lower mold halves having a convex surface, followed by carrying out press molding.

However, because this glass member approximated to the catenary curve has a convex shape on one face, it is unsteady in precise press molding. Therefore, defective molding is liable to occur. Furthermore, there is a method in which a glass material is cut away from a glass block material, and is then ground and polished to give an optical element having a biconcave face. However, in this case, a long time may be required for carrying out many steps in an alternating succession, which may consequently result in increase in cost.

Meanwhile, a glass preliminary molding previously having a convexo-concave or biconvex shape was disclosed (for example, Japanese Patent Application First Publication No. H09-12318).

However, the glass preliminary molding described in the document is based on requirement of change of the mold for preliminary molding to appropriately correspond to the final shape of the optical element, so to speak; therefore, a certain glass preliminary molding cannot adapt to the pressing for every final shape. Therefore, consideration of the lifetimes of molds for manufacturing the preliminary molding has become necessary, and thus the method is far from being envisaged as an ultimate solution in light of reduction in cost.

DISCLOSURE OF THE INVENTION

The present invention provides a preform for an optical element which enables prolongation of lifetimes of molds in a series of steps of manufacturing an optical glass element and enables reduction in percent of generation of defective molding articles and which can be produced according to a simple method, and provides a method of manufacturing the same.

A first preform for molding an optical glass element of the present invention has a somewhat flattened hemispherical shape, and its halved face includes a concave face. Moreover, a second preform for molding an optical glass element of the present invention is a preform for molding an optical glass element having a somewhat thick discoidal shape, while the top surface and the under surface both having a concave face. Also, a third preform for molding an optical glass element of the present invention is a preform for molding an optical glass element having a thin flattened shape, while the top surface and the under surface both having a convex face.

According to these embodiments, it is expected that upon pressing with a convex pressing die or a concave pressing die in the following molding step, the aforementioned concave face or convex face may match this convex pressing die or concave pressing die, or fit thereto, thereby allowing the pressing force of the pressing die to be uniformly applied to the preform. Furthermore, the preform does not usually have a projection or the like that engages with another member or component, and its settling position may be mostly determined by gravitation and shearing force resulting from compressive force, frictional force and the like applied from the surface to be brought into contact. Furthermore, how it is settled may decide whether it is stable (stable against some variation) or unstable (unstable because some variation causes further greater variation). It is likely to be unstable when the shape of the pressing die is different from the shape of the face of the preform to be in contact. Therefore, a preferable shape of the preform and contact with the pressing die will allow the pressing force of the pressing die to be uniformly applied to the entirety in either case of the pressing die having a convex shape or the pressing die having a concave shape. Hence, because of favorable settlement of the preform, occurrence of defective molding articles may be reduced.

As described above, matching of the shape of the leading end of the pressing die used in the following molding step with the concave face, or with the curved face in the vicinity of approximately the central position in top view of the convex face of the preform is important. In the case in which the shape of the leading end of the pressing die is a shape of an approximately spherical face, it is preferred that the curvature radius of the concave face, or of the curved face in the vicinity of approximately the central position of the convex face of the preform be nearly equal to that of the shape of the leading end of the pressing die.

When the curvature radius of the concave face of the preform is relatively too great, too great pressure may be applied to approximately the central position of the concave face of the preform. When the curvature radius is relatively too small, the pressure may not be directly applied to approximately the central position of the concave face of the preform but may be applied circularly to its periphery, and in addition, just a slight inclination of the pressing mold may lead to deviation of the pressure applied to a part of the ring. Curvature radius of the curved face in the vicinity of approximately the central position of the concave face of the preform is preferably somewhat greater than that of the shape of the leading end of the pressing die because it is expected that the pressure is likely to be applied more uniformly.

When the curvature radius of the convex face of the preform is relatively too great, the pressure may not be directly applied to approximately the central position of the convex face of the preform but may be applied circularly to its periphery, and in addition, just a slight inclination of the pressing die may lead to deviation of the pressure applied to a part of the ring. When the curvature radius is relatively too small, too great pressure may be applied to approximately the central position of the convex face. Curvature radius of the curved face in the vicinity of approximately the central position of the convex face of the preform is preferably somewhat smaller than that of the shape of the leading end of the pressing die because it is expected that the pressure is likely to be applied more uniformly.

Additionally, it is preferred that the ratio of the wall thickness of the preform in the vicinity of approximately the central position of the concave face of the preform to the aforementioned diameter be 1.0 or less. Also, this ratio is more preferably 0.2 or greater. Moreover, this ratio is more preferably 0.9 or less. Accordingly, appropriate amount of deformation may be imparted to the preform to allow products to be molded.

When the top surface and the under surface of the preform both have a shape including a convex face, it is preferred that the ratio of wall thickness of the preform in the vicinity of approximately the central position of the convex face of the top surface and the under surface to the aforementioned diameter be 0.45 or less. Also, this ratio is more preferably 0.1 or greater. Moreover, this ratio is preferably 0.3 or less. When the ratio falls within this range, occurrence of chipping of the manufactured preform can be reduced, and in addition, pressing time can be shortened due to a small amount of deformation.

More specifically, the following is provided.

(1) A preform for molding an optical glass element which exhibits an almost circular shape having a predetermined diameter in top view and exhibits a flattened semicircular shape having a downwardly convex curve and a nearly horizontal straight line on the upper end side in side view such that the distance from the lowermost part of the convex curve to the straight line becomes a predetermined height of the flattened semicircular shape, and which has a concave face on the top surface and a convex face on the bottom face, wherein the concave face on the top surface forms the lowermost part of the concave face at an approximately the central position in almost circular shape in the top view; the convex face on the bottom face forms the lowermost part of the convex face at the central position of the bottom face corresponding to the aforementioned approximately the central position; and the ratio of the height of the flattened semicircular shape to the diameter of the almost circular shape in the top view is from 0.2 to 0.9.

(2) The preform for molding an optical glass element according to the above aspect (1) wherein the concave face has, at approximately the central position in almost circular shape in the top view, ratio of the distance of from the lowermost part of the concave face to the straight line of the upper end side in the side view to the diameter of the almost circular shape in the top view is from 0.02 to 0.9.

(3) The preform for molding an optical glass element according to the above aspect (1) or (2) wherein, at approximately the central position in almost circular shape in the top view, ratio of the wall thickness of the preform that is a distance of from the lowermost part of the convex face to the lowermost part of the concave face in the side view to the diameter of the almost circular shape in the top view is from 0.2 to 0.9.

(4) The preform for molding an optical glass element according to any one the above aspects (1) to (3) wherein the ratio of the predetermined height of the flattened semicircular shape in the side view to the diameter of the almost circular shape in the top view is from 0.2 to 0.9.

(5) The preform for molding an optical glass element according to any one the above items (1) to (4) wherein the convex face has a ratio of the curvature radius in the vicinity of the lowermost part of the convex face to the curvature radius in the vicinity of the lowermost part of the concave face on the concave face being from 0.4 to 10.

(6) A preform for molding an optical glass element which exhibits an almost circular shape having a predetermined diameter in top view, and which has a concave face on both of the top surface and the under surface, wherein the concave face on the top surface forms the lowermost part of the concave face at approximately the central position in almost circular shape in the top view; the concave face on the bottom face forms the uppermost part of the concave face at the central position of the under surface corresponding to the aforementioned approximately the central position; and ratio of the height of the flattened elliptic shape in the side view to the diameter (D) of the almost circular shape in the top view is from 0.1 to 0.9.

(7) A preform which exhibits an almost circular shape having a predetermined diameter in top view and has a flattened elliptic shape having a nearly horizontal straight line on the top end and lower end sides in side view such that the distance between the top end and the lower end in the side view becomes a predetermined height (h) of the flattened elliptic shape, and which has a concave face on both of the top surface and the under surface, wherein the concave face on the top surface forms the lowermost part of the concave face at an approximately the central position in almost circular shape in the top view; the concave face on the bottom face forms the uppermost part of the concave face at the central position of the under surface corresponding to the approximately central position; and ratio of the height of the flattened elliptic shape in the side view to the diameter (D) of the almost circular shape in the top view is from 0.1 to 0.9.

(8) The preform for molding an optical glass element according to the above aspect (6) wherein ratio of sum ($\Delta h1 + \Delta h2$) of a distance ($\Delta h1$) of from the lowermost part of the concave face to the upper end side on one concave face in the side view and a distance ($\Delta h2$) of from the uppermost part of the concave face to the lower end side on another concave face in the side view to the diameter (D) of the almost circular shape in the top view is from 0.02 to 0.9.

(9) The preform for molding an optical glass element according to the above aspect (6) or (8) wherein ratio of wall thickness (t) of the preform that is a distance of from the lowermost part of the concave face on one concave face to the uppermost part of the concave face on another concave face in the side view to the diameter (D) of the almost circular shape in the top view is from 0.2 to 0.9.

(10) The preform for molding an optical glass element according to any one of the above aspects (6) to (9) wherein ratio of a curvature radius (R1) in the vicinity of the lowermost part of the Concave face on one concave face in the side view to a curvature radius (R2) in the vicinity of the uppermost part of the concave face on another concave face in the side view is from 0.1 to 10.

(11) A preform for molding an optical glass element which exhibits an almost circular shape having a predetermined diameter in top view, and which has a convex face on both of the top surface and the under surface, wherein the convex face on the top surface forms the uppermost part of the convex face at an approximately the central position in almost circular shape in the top view; the convex face on the bottom face forms the undermost part of the convex face at the central position of the under surface corresponding to the approximately central position; and ratio of the wall thickness (t) of the preform that is a distance of from the uppermost part of the convex face in the top face to the lowermost part of the convex face on the under surface in the side view to the diameter (D) of the almost circular shape in the top view is 0.45 or less.

(12) The preform for molding an optical glass element according to any one of the above aspects (1) to (11) which comprises a silica-boric acid based or lanthanum-based optical glass that is a material preferred for optical use.

(13) An optical element produced by subjecting the preform according to any one of the above aspects (1) to (12) to precise press molding.

According to the first preform of the present invention, a desired shape is preferably molded by compression through pressing with an upper mold half having a curvature radius matched predominantly at the leading end to the curvature radius of the aforementioned concave face while the concave face to be its top surface setting upward, against a face that matches the convex face on the bottom face of the preform, being a face that has a concave shape of a lower mold half as a receiving mold half. Moreover, according to the second preform, a desired shape is preferably obtained by compression through pressing with an upper mold half having a curvature radius matched predominantly at the leading end to the curvature radius of the concave face while the concave face setting upward, against a face that matches the concave face on the bottom face of the preform, being a face that has a convex shape of a lower mold half as a receiving mold half. Also, in connection with the third preform, a desired shape is preferably obtained by compression through pressing with an upper mold half having a curvature radius matched predominantly at the leading end to the curvature radius of the convex face while the convex face setting upward, against a face that matches the convex face on the bottom face of the preform, being a face that has a concave shape of a lower mold half as a receiving mold half.

PREFERRED MODE FOR CARRYING OUT THE INVENTION

Hereinafter, the first preform of the present invention will be explained in detail with reference to FIGS. 1 to 4. Furthermore, the second preform of the present invention will be explained in detail with reference to FIGS. 5 to 8. Moreover, the third preform of the present invention will be explained in detail with reference to FIGS. 9 to 12. In the following description of the embodiments, common constitutive elements are designated by the same reference number, and the explanation thereof will be omitted or simplified.

Height of the preform referred to herein means a distance to the highest position in the vertically upward direction when the preform was horizontally immobilized such that one side faces downward. Center wall thickness of the preform means the length of the thickness of the prefotm at approximately the center of the preform. Depthof the preform at the concave part means a distance to a straight line which was drawn to be nearly horizontal on the upper end side or bottom part side from the low point of the concave part curvature in side view, when the preform was horizontally immobilized such that one side faces downward. External diameter of the preform means a diameter of the preform viewed from above.

First Preform

Figure 1:
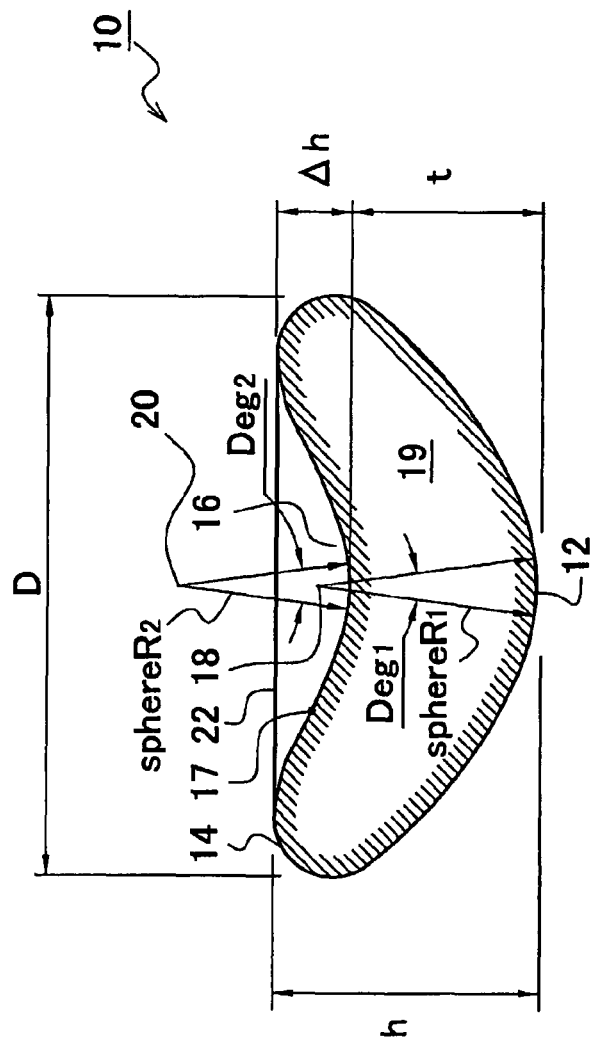
FIG. 1 shows a cross sectional view illustrating a preform.

FIG. 1 shows a cross sectional view of the first preform (or glass gob) 10 of the present invention. The preform 10 has a circular shape having a diameter (D) in top view, or a shape somewhat flattened from a hemispherical shape having a diameter (D) viewed sterically. Umbilical position of this hemispherical shape is an under surface central point 12 of the leading end part of the convex shape shown at the bottom side of the Figure, which corresponds to the lowermost part of the convex face. Also in bottom view, the preform exhibits a circular shape having a diameter (D) with this under surface central point 12 as a center. A cross section 19 having a boomerang-like shape (or opened V shape) to which oblique lines are added on this under surface central point 12 is presented. This preform shows a rotation symmetry with respect to an axis perpendicularly extending in the Figure and passing the under surface central point 12, and has a shape that is in plane symmetry with respect to a vertical plane including the cross section 19.

The cross section 19 has a shape extending obliquely upward with respect to both right and left as described above, and the right and left leading ends in the cross section follow a circular arc 14 having a predetermined radius, and reach to the contour line of the cross section smoothly connecting to the top surface of the preform 10. This top surface has a concave face 16 gently descending from the circumferential part 22 having the maximum height of this preform in the Figure (which will be explained below), and the contour line in the cross section 19 passes over the inflection point 17 through the aforementioned circular arc 14 to be directed toward the center of the recess of the concave face 16. The curvature changes in the vicinity of the inflection point 17, but position and extent of the inflection may vary depending on the manufacturing method and manufacturing condition upon manufacture in effect.

Vicinity of the under surface central point 12 of the leading end of the convex part of the preform 10 consists of a part of a spherical surface "sphere R1". Center 18 of the "sphere R1" is situated on the axis of the aforementioned rotation symmetry but is situated higher than the surface of the concave face 16. Scope of this "sphere R1" falls within the scope to comply with "Deg 1" or less in the cross section 19. Similarly, the central part of the concave face 16 of the preform 10 consists of a part of the spherical surface of a "sphere R2". Center 20 of the "sphere R2" is situated on the axis of the aforementioned rotation symmetry.

The scope of this "sphere R2" falls within the scope to comply with "Deg 2" or less in the cross section 19.

A region between the under surface central point 12 and the circular arc 14 of the leading end of the convex part of the preform 10 has a predetermined spherical surface; however, the center of the same is not situated on the axis of the circular symmetry, but is shifted to the right in the Figure (to the left in symmetry of the convex face on the right side).

The parameters D, R1, R2, Deg 1 and Deg 2 which may be used herein may fall within the following ranges, respectively.

TABLE 1

|      | Lower limit | Upper limit |
| ---- | ----------- | ----------- |
| D    | 5.0         | 20          |
| R1   | 8           | 60          |
| R2   | 6           | 20          |
| Deg1 | 3           | 30          |
| Deg2 | 10          | 40          |

Height of the preform referred to herein may mean, for example, when the preform 10 was horizontally immobilized such that its under surface central point 12 which shall be top of the convex part of the preform faces downward, a distance of from the face where the preform is placed to the highest position in the vertically upward direction, specifically, means the distance (h) in FIG. 1. In other words, in the flattened semicircular shape having a downwardly convex curve and a nearly horizontal straight line on the upper end side in side view, the distance of from the lowermost part of the convex curve to the straight line is the predetermined height (h) of the flattened semicircular shape. Depth of the preform at the concave part corresponds to, for example, when the preform was horizontally immobilized such that the convex part of the preform faces downward, difference between the vertical distance (t) from the face where the preform is placed to the bottom point of the preform concave part curvature, and the aforementioned height (h) of the preform. Specifically, the depth corresponds to ($\Delta h$) in FIG. 1. In other words, it corresponds to a distance ($\Delta h$) from the lowermost part of the concave face on the top surface to the aforementioned straight line of the aforementioned upper end side, at approximately the central position in almost circular shape in top view.

Center wall thickness of the preform means a distance of from the top point of the convex part curvature to the bottom point of the concave part curvature. In FIG. 1, the center wall thickness corresponds to the distance represented by (t) in FIG. 1.

External diameter of the preform herein means a diameter of the preform viewed from above. In FIG. 1, the external diameter means the distance represented by the diameter (D).

In this Example, the depth ($\Delta h$) of the concave part is preferably 0.02 times or greater of the external diameter of the preform. Also, it is preferably 0.9 times or less of the depth ($\Delta h$) of the concave part. When the recession of the concave part on the concave face 16 is too great with respect to the external diameter, the preform is liable to be chipped when the preform is molded, thereby leading to possibility of increase in percent of defective articles produced. In contrast, when the recession is too small, the amount of deformation of the glass in the following precise press molding becomes too great, thereby leading to possibility of reduction in lifetime of the mold and increase in the cycle time in precise press molding.

In Examples of the present invention, it is preferred that the center wall thickness (t) be 0.2 times or greater of the external diameter (D) of the preform. Also, it is preferably 0.9 times or less of the external diameter (D) of the preform. When the center wall thickness is too small with respect to the external diameter, the preform is liable to be chipped when it is molded, thereby leading to possibility of increase in percent of defective articles produced. In contrast, when the center wall thickness is too great, the amount of deformation of the glass in the following precise press molding becomes so great that reduction in lifetime of the mold and increase in the cycle time may be caused.

In Examples of the present invention, it is preferred that the height (h) have the lower limit of 0.2 times and the upper limit of 0.9 times of the external diameter of the preform. When the height herein is too small with respect to the external diameter, excess pad will spread to increase the external diameter, thereby yielding a thin wall which is liable to be chipped. In contrast, when the height is too great, amount of deformation in the molding becomes so great that reduction in lifetime of the mold and increase in the cycle time may occur.

The external diameter and the center wall thickness of the preform of the present invention are not particularly limited, but in light of the working efficiency, the upper limit of the external diameter may be preferably 20 mm, more preferably 15 mm, and most preferably 12 mm. Furthermore, the lower limit of the external diameter may be preferably 5 mm, more preferably 7 mm, and most preferably 9 mm. Meanwhile, the upper limit of the center wall thickness may be preferably 18 mm, more preferably 12 mm, and most preferably 8.5 mm. Moreover, the lower limit of this center wall thickness may be preferably 1.0 mm, more preferably 2.0 mm, and most preferably 3.5 mm.

For the measurement of the curvature radius R of the preform of the present invention, for example, it may be carried out using a $\phi 4$ measuring instrument. Specifically, the $\phi 4$ measuring instrument is a cup gauge including a cup having a internal diameter of "$\phi 4$" and a sensing pin. Amount of displacement of the sensing pin can be read with a digital meter. First, the position of the top surface of the cup and position of the sensing pin are aligned using a base plate, and the position is defined as a base (reading on the digital meter being zero). Next, the measuring face of the preform of which is pressed against the cup, and the sensing position is read from the digital meter ($\Delta H$). This value is substituted for the following formula (I) to derive the curvature radius R.

$$R = \frac{4^2 + 4 \times (\Delta H)^2}{8 \times \Delta H} \quad (1)$$

Figure 2:
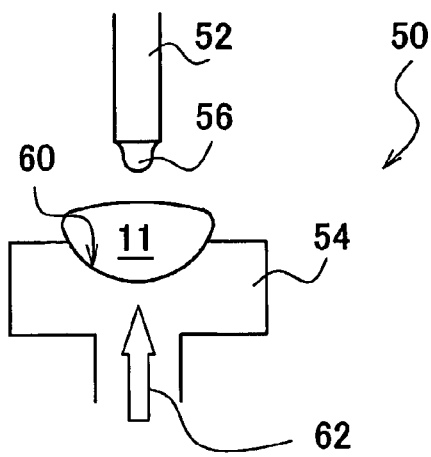
FIG. 2 shows an explanatory view illustrating a feeding step of a molten glass.
Figure 3:
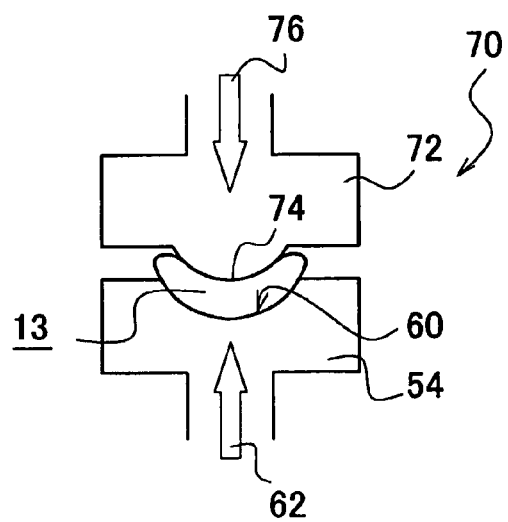
FIG. 3 shows an explanatory view illustrating a step of manufacturing a preform by pressing a glass block with an upper mold half.
Figure 4:
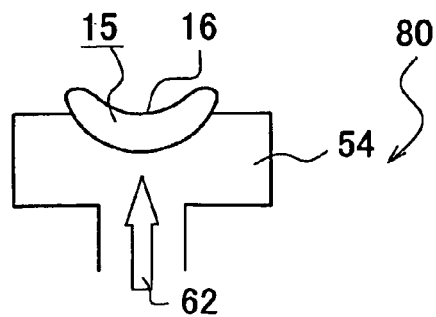
FIG. 4 shows a view illustrating a state after removing the upper mold half from the state shown in FIG. 3.

The first preform of the present invention can be manufactured by the following manufacturing steps schematically illustrated in FIGS. 2 to 4. FIG. 2 shows an apparatus 50 and the step for feeding a molten glass to accumulate a glass block 11 having a predetermined weight. With respect to the glass block 11 having a predetermined weight prior to molding, as shown by a molten glass 56 dropping in part at the feed port from a nozzle 52 of the apparatus for feeding a molten glass, a molten glass heated to a predetermined temperature is fed and accumulated in a lower mold half (or receiving mold) 54 in a predetermined amount. The lower mold half 54 herein has fine wind holes opened, thus as shown by an arrow 62, any of hot wind, warm wind and cold wind can be fed thereto. This feeding serves to prolong the lifetime of the lower mold half, but the wind may not also be fed. The molten glass accumulated in the lower mold half 54 forms a glass block 11 while being cooled to some extent by the gas atmosphere, and moves to a place where the upper mold half 72 is applied together with the lower mold half 54.

FIG. 3 shows an apparatus 70 and a step for forming the concave part of the preform by pressing force with the upper mold half 72. The glass block 11 moved together with the lower mold half 54 turns into the state of a predetermined glass surface temperature, pressed by the upper mold half 72 disposed at an opposing position. Accordingly, a preform for an optical element 13 having a concave part can be obtained. During this process, the wind having a predetermined temperature is fed from the face 60 of the lower mold half 54 as shown by the arrow 62, and simultaneously, the wind having a predetermined temperature is also fed from the upper mold half 72 as shown by an arrow 76.

Moreover, the shape of the lower mold half 54 is not limited by a particular curvature radius, and it may or may not emit a gas itself. FIG. 4 shows a status of taking off the upper mold half 72 that forms the concave part on the concave face 16 shown in FIG. 3 to remove the preform 15 as a product. In the description of FIGS. 2 to 4, a lens having a concavo-convex shape or the like is assumed as an optical element manufactured with the preform. However, when the finally obtained molded product is a biconcave lens or the like, lower side face in the Figure can be formed to have a concave shape by using the receiving mold of the preform with a convex shape or by moving the piece once received on a concave shape to the receiving mold with a convex shape. Hence, the entirety or a part of the formed face can be freely regulated to have the concave shape according to the method as described above.

Second Preform

Figure 5:
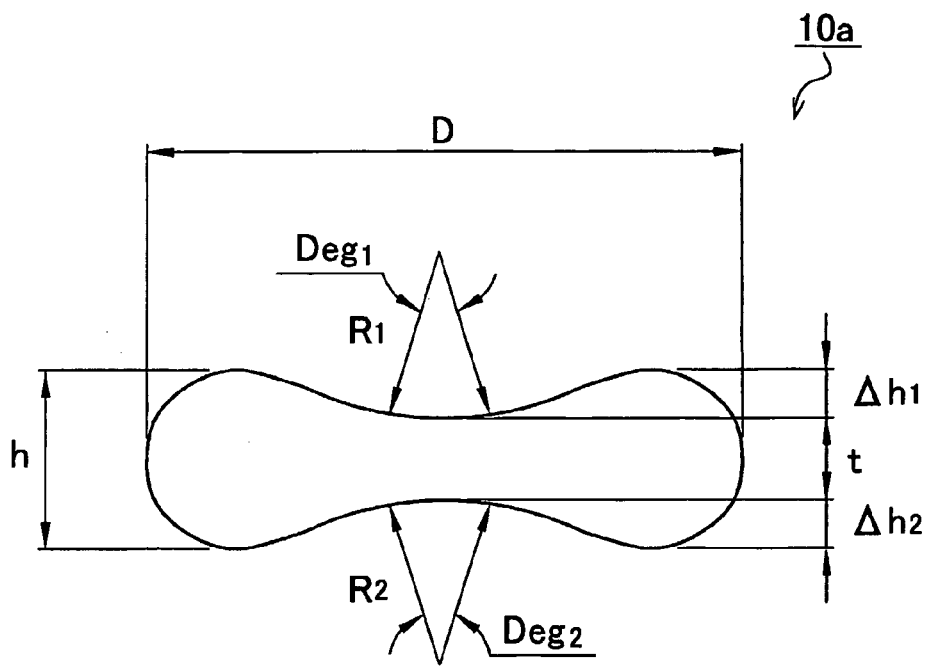
FIG. 5 shows a cross sectional view illustrating a preform according to the second embodiment.

FIG. 5 shows a cross sectional view illustrating one example of the second preform of the present invention. This preform 10a has a circular shape having a diameter (D) in top view, or a shape including flattened portions of a hemispherical shape having a diameter (D) and being connected in a vertically symmetric manner viewed sterically. That is, the second preform is different from the first preform shown in FIG. 1 in terms of the under surface forming a concave part as shown in FIG. 5.

The cross section has a shape extending obliquely upward with respect to both right and left and further extending obliquely downward with respect to both right and left, and the right and left leading ends in the cross section follow a circular arc having a predetermined radius and reach to the contour line smoothly connecting to the top surface and the under surface of the preform. These top and under surfaces have a concave face gently sloping from the circumferential part. Curvature radius and depth of this concave face may be altered freely depending on the manufacturing condition. Parameters D, R1, R2, Deg 1 and Deg 2 which may be used herein may fall within the following range, respectively.

TABLE 2

|      | Lower limit | Upper limit |
|------|-------------|-------------|
| D    | 5.0         | 20          |
| R1   | 6           | 60          |
| R2   | 6           | 60          |
| Deg1 | 3           | 40          |
| Deg2 | 3           | 40          |

In this embodiment, sum ($\Delta h1 + \Delta h2$) of depths of both of the concave parts is preferably 0.02 times or greater of the external diameter (D), more preferably 0.05 times or greater, and most preferably 0.1 times or greater. Furthermore, sum ($\Delta h1 + \Delta h2$) of depths of both of the concave parts is preferably 0.9 time or less, more preferably 0.7 times or less, and most preferably 0.5 times or less. When the depths of both of the concave parts are too great with respect to the external diameter, chipping is liable to be caused when the preform is molded, thereby leading to increase in percent of defective articles produced. In contrast, when the depths are too small, the amount of deformation of the glass in the following precise press molding becomes too great, thereby leading to possibility of reduction in lifetime of the mold and increase in the cycle time in precise press molding.

In this embodiment, the center wall thickness (t) is preferably 0.2 times or greater of the external diameter (D) of the preform, more preferably 0.3 times or greater, and most preferably 0.4 times or greater. Also, it is preferably 0.9 times or less of the external diameter D of the preform, more preferably 0.8 times or less, and most preferably 0.7 times or less. When the center wall thickness is too small with respect to the external diameter, the preform is liable to be chipped when the preform is molded, thereby leading to possibility of increase in percent of defective articles produce. In contrast, when the center wall thickness is too great, the amount of deformation of the glass in the following precise press molding becomes too great, thereby leading to possibility of reduction in lifetime of the mold and increase in the cycle time in precise press molding.

In this embodiment, the height h has the lower limit of 0.1 times, more preferably 0.2 times and most preferably 0.3 times of the external diameter D of the preform, and has the upper limit of 0.9 times, more preferably 0.8 times and most preferably 0.7 times. When the height herein is too small with respect to the external diameter, excess pad will spread to increase the external diameter, thereby yielding a thin wall which is liable to be chipped. In contrast, when the height is too great, amount of deformation in the molding becomes so great that reduction in lifetime of the mold and increase in the cycle time may be caused.

The external diameter and the center wall thickness of the preform of the present invention are not particularly limited, but in light of the working efficiency, upper limit of the external diameter may be preferably 20 mm, more preferably 15 mm, and most preferably 12 mm. Furthermore, lower limit of the external diameter may be preferably 5 mm, more preferably 7 mm, and most preferably 9 mm. Meanwhile, upper limit of the center wall thickness may be preferably 18 mm, more preferably 12 mm, and most preferably 8.4 mm. Moreover, lower limit of this center wall thickness may be preferably 1.0 mm, more preferably 2.0 mm, and most preferably 3.5 mm.

Manufacturing Example

Figure 6:
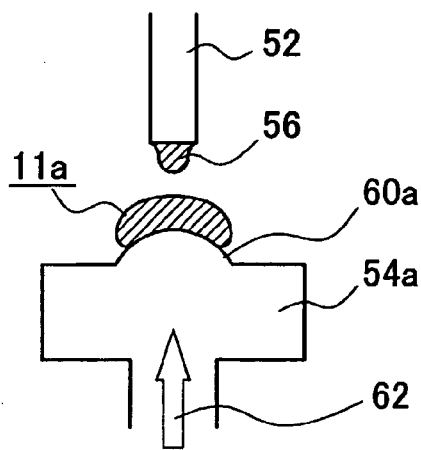
FIG. 6 shows an explanatory view illustrating a feeding step of molten glass in the manufacturing step according to the second embodiment.
Figure 7:
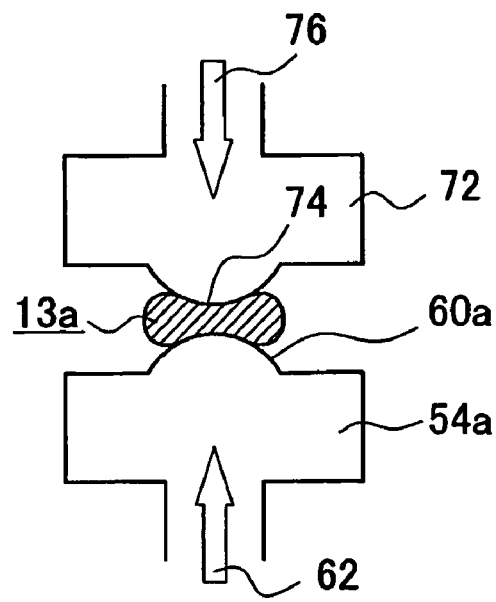
FIG. 7 shows an explanatory view illustrating a step of manufacturing a preform by pressing a glass block with an upper mold half in the manufacturing step according to the second embodiment.
Figure 8:
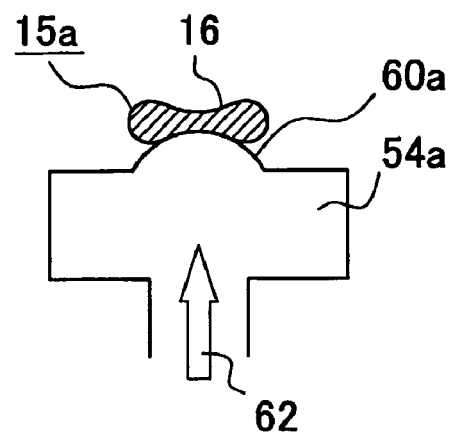
FIG. 8 shows a view illustrating a state after removing the upper mold half from the state shown in FIG. 7.

The second preform in this embodiment can be manufactured by the manufacturing steps similar to those for the first preform. More specifically, as shown in FIGS. 6 to 8, the difference from the first preform shown in from FIG. 2 to FIG. 4 is found only in terms of the face 60a on the lower mold half 54a being convex. Other matters, i.e., apparatus for and step of feeding of the molten glass and accumulating the glass block having a predetermined weight (FIG. 6), step of pressing with the upper mold half 72 to manufacture the preform (FIG. 7), step of taking off the upper mold half and removing the product (FIG. 8) may be employed which are similar to those in the method for the first preform. Accordingly, preforms 13a and 15a having a biconcave part can be manufactured.

Third Preform

Figure 9:
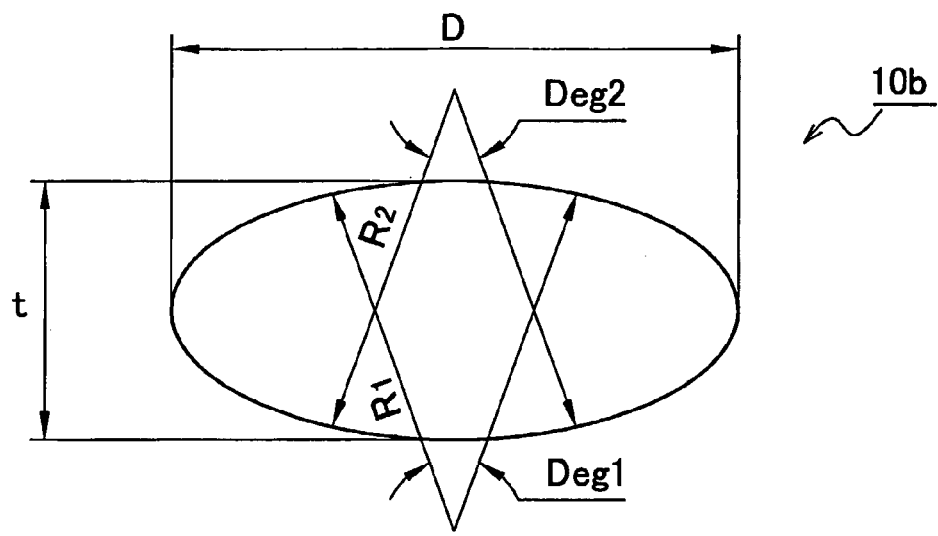
FIG. 9 shows across sectional view illustrating a preform according to the third embodiment.

FIG. 9 shows a cross sectional view illustrating one example of the third preform of the present invention. This preform 10b has a circular shape having a diameter (D) in top view, or a shape including flattened portions of a hemispherical shape having a diameter (D) and being connected in a vertically symmetric manner viewed sterically. That is, the third preform is different from the first preform shown in FIG. 1 in terms of the upper surface forming a convex part as shown in FIG. 9.

The cross section has a shape extending obliquely upward with respect to both right and left, and the right and left leading ends in the cross section follow a circular arc having a predetermined radius to reach to the contour line smoothly connecting to the top surface of the preform. These top and under surfaces have a convex face gently curved from the circumferential part. Diameter (D) and wall thickness (t) of this third preform can be altered freely depending on manufacturing conditions. Parameters D and t which may be used herein may fall within the following ranges, respectively.

TABLE 3

|   | Lower limit | Upper limit |
| --- | --- | --- |
| D | 10 | 20 |
| t | 3 | 6 |

In this embodiment, the center wall thickness t is preferably 0.45 times or less of the external diameter D of the preform, and more preferably 0.40 times or less. In particular, when a glass having a high viscosity or a glass having high Tg is used, the center wall thickness of 0.3 times or less of the external diameter D of the preform is most practical in light of less charging amount and reduction in energy for use. When the center wall thickness is too great with respect to the external diameter, press molding requires a long time, which may result in economic disadvantages due to the need for high levels of great energy consumption. Additionally, the wall thickness t of the preform is preferably 0.05 times or greater of the external diameter D, and more preferably 0.1 times or greater, because too small a wall thickness of the preform may lead to increased probability of chipping in molding.

The external diameter and the center wall thickness of the preform of the present invention are not particularly limited, but in light of the working efficiency, the upper limit of the external diameter may be preferably 20 mm, more preferably 18 mm, and most preferably 17 mm. Furthermore, the lower limit of the external diameter may be preferably 10 mm, more preferably 12 mm, and most preferably 13 mm. In addition, the upper limit of the center wall thickness may be preferably 6 mm, more preferably 5.5 mm, and most preferably 5 mm. Moreover, the lower limit of the center wall thickness may be preferably 3 mm, more preferably 3.5 mm, and most preferably 4 mm.

Manufacturing Example

Figure 10:
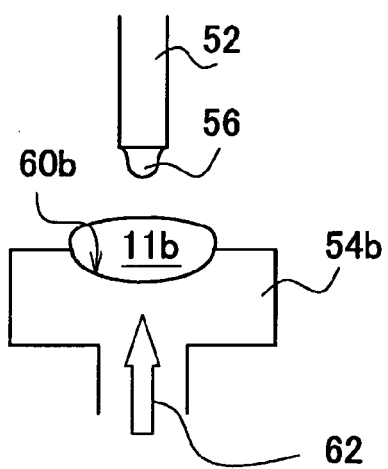
FIG. 10 shows an explanatory view illustrating a feeding step of a molten glass in the manufacturing step according to the third embodiment.
Figure 11:
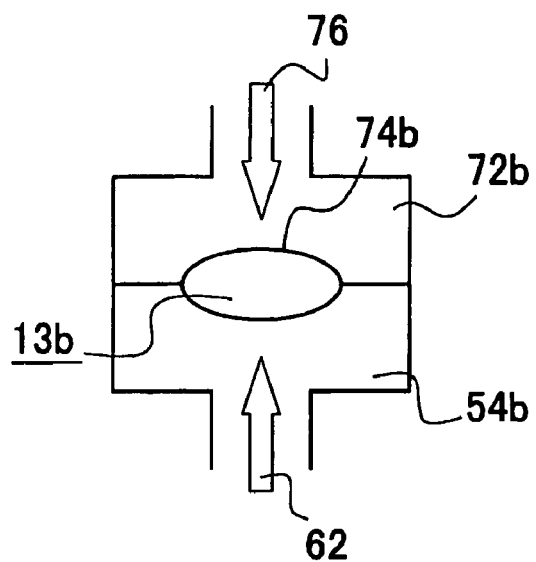
FIG. 11 shows an explanatory view illustrating a step of manufacturing a preform by pressing a glass block with an upper mold half in the manufacturing step according to the third embodiment.
Figure 12:
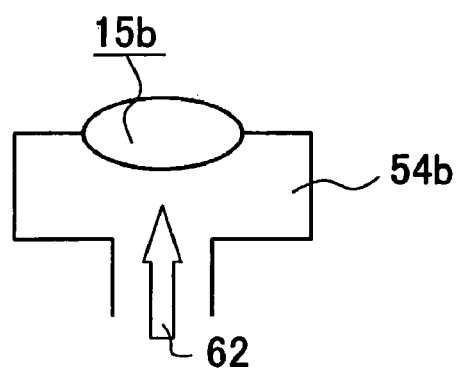
FIG. 12 shows a view illustrating a state after removing the upper mold half from the state shown in FIG. 11.

The third preform in this embodiment can be manufactured by the manufacturing steps similar to those for the first preform. More specifically, as shown in FIGS. 10 to 12, difference from the first preform shown in FIG. 2 to FIG. 4 is found only in terms of the face 74b on the upper mold half 72b being concave. Other matters, i.e., apparatus for and step of feeding of the molten glass and accumulating the glass block having a predetermined weight (FIG. 10), step of pressing with the upper mold half 72b to manufacture the preform (FIG. 11), step of taking off the upper mold half and removing the product (FIG. 12) may be employed which are similar to those in the method for the first preform. Accordingly, preforms 13b and 15b having a biconvex part can be manufactured.

EXAMPLES

Next, specific examples will be explained.

Example 1

Melting was conducted in a glass melting furnace to give the glass melting temperature of 1100 to 1300° C., while a nozzle 52 at the leading end of a pipe was heated at a temperature of 900 to 1200° C. Next, a lower mold half 54 was disposed immediately below the nozzle 52, and a glass block 11 was dropped, or elevated to approach the nozzle 52. When the concave molding face of the lower mold half 54 was filled with the molten glass accordingly, the lower mold half 54 was lowered. The molten glass was cut then to obtain a glass block 11.

The material of the lower mold half 54 was a porous metal, and emits any one of inert gases such as air, oxygen, nitrogen, argon and the like or any mixed gas thereof at 0.5 to 10 L/min. The lower mold half 54 holding the glass block 11 was pressed with the upper mold half 72 to obtain a preform for an optical element 13 having a concave part. In this example, two kinds, i.e., a silica-boric acid based or lanthanum-based optical glass were used as an optical glass composition.

Example 2

A glass block 11 was obtained with a lower mold half 54 with no emission of a gas under a temperature condition that is similar to Example 1. The lower mold half 54 holding this glass block 11 was moved immediately below an upper mold half 72 provided with fine pores that emit the gas, and simultaneously, was pressed by a pressing face 74 of the upper mold half 72 disposed at an opposing position under a condition of the glass surface temperature of 800 to 1150° C. Thus, a preform for an optical element 13 having a concave part was obtained.

In the pressing method, pressing against an open face of the glass block 11 was serially conducted for 1 to 10 sec. Surface of the preform for an optical element 13 having a concave part obtained according to this method was a smooth mirror face.

The glass preform produced in this manner had a center wall thickness being 0.3 times of the external diameter, a depth of the concave part being 0.06 times of the external diameter, and a height being 0.4 times of the external diameter.

Example 3

A preform for an optical element having a biconcave part was obtained through manufacturing according to a similar method to Example 1 except that the lower mold half in Example 1 was changed to a lower mold half having a convex shape. In this Example, two kinds, i.e., a silica-boric acid based or lanthanum-based optical glass were used as an optical glass composition.

Example 4

A preform for an optical element having a biconcave part was obtained through manufacturing according to a similar method to Example 2 except that the lower mold half in Example 2 was changed to a lower mold half having a convex shape. In the pressing method, pressing against an open face of the glass block was serially conducted for 1 to 10 sec. Surface of the preform for an optical element having a biconcave part obtained according to this method was a smooth mirror face. Also, thus resulting preform had a center wall thickness 0.4 times the external diameter, the sum of depths of the biconcave parts depth 0.2 times the external diameter, and the height 0.6 times the external diameter.

Example 5

A preform for an optical element having a biconvex part was obtained through manufacturing according to a similar method to Example 1 except that the upper mold half in Example 1 was changed to an upper mold half having a concave part. In this Example, two kinds, i.e., a silica-boric acid based or lanthanum-based optical glass were used as an optical glass composition.

Example 6

A preform was manufactured according to a similar method to Example 5 to yield different physical properties. Physical property values of Example 5 and Example 6 are shown in Table 4.

TABLE 4

|  | Example 5 | Example 6 |
| --- | --- | --- |
| D | 13.5 | 14.0 |
| T | 5.0 | 6.0 |
| t/D | 0.37 | 0.43 |
| R1 (free surface, top surface) | 42 | 64 |
| R2 (mold surface, under surface) | 42 | 30 |
| R1/R2 | 1.0 | 2.1 |

Test Example 1

Using the preform for an optical element produced in Example 1 or 2, a precise press test was carried out. The preform of the present invention used in Test Example 1 had a center wall thickness 0.3 times the external diameter, a depth of the concave part 0.06 times the external diameter, and a height 0.4 times the external diameter.

The preform for an optical element was heated to a temperature corresponding to $10^4$ to $10^{11}$ Pa·s. Next, the preform was compressed with the upper mold half at 100 to 300 kg/cm$^2$, for 3 to 60 sec, followed by cooling and mold release to obtain a final molded product.

Moreover, as a Comparative Example, a precise press test was carried out on a biconvex preform having an external diameter of 10 mm and a center wall thickness of 6.5 mm under the same pressing condition. The present preform for an optical element exhibited stable settlement in precise press molding, and very few defective molded articles were produced.

Comparison of defect extent of the present preform for an optical element and, for example, the biconvex glass gob is shown in Table 5. The defect extent herein means chips, cracks, fusion with the mold and the like. For example, percent defect extent of 2% means the ratio of the number of occurrence of defects per number of press shots.

TABLE 5

| Number of press shots | Preform of the present manufacturing method percent defective extent | Comparative biconvex glass gob percent defective extent |
| --- | --- | --- |
| 100 shots | 0% | 0% |
| 200 shots | 0% | 2% |
| 500 shots | 0% | 3% |

As shown in Table 5, the preform for an optical element of the present invention generated no defectives in serial 500 shots, while the biconvex gob generated defectives in 200 shots. This is believed to be caused by the biconvex glass gob which exhibits unstable settlement in pressing and which involves great amount of deformation.

Test Example 2

Using the preform for an optical element produced in Example 3 or 4, a precise press test was carried out. The preform of the present invention used in Test Example 2 had a center wall thickness 0.4 times the external diameter, the sum of depths of both concave parts 0.2 times the external diameter, and a height 0.6 times the external diameter.

The preform for an optical element was heated to a temperature corresponding to $10^4$ to $10^{11}$ Pa·s. Next, the preform was compressed with the upper mold half at 100 to 300 kg/cm$^2$, for 3 to 60 sec, followed by cooling and mold release to obtain a final product.

Moreover, as a Comparative Examples, a precise press test was carried out on a biconvex preform having an external diameter of 10 mm and a center wall thickness of 6.5 mm (Comparison 2), and on a convexo-concave preform having an external diameter of 11 mm and a center wall thickness of 5.0 mm (Comparison 1) under the same condition. The present preform for an optical element exhibited extremely stable settlement in precise press molding, and very few defective molded articles were produced.

Comparison of defect extent of the present preform for an optical element and, for example, the biconvex preform and the convexo-concave preform is shown in Table 6. The defect extent herein means chips, cracks, fusion with the mold and the like. For example, percent defect of 2% means the ratio of the number of occurrence of defects per number of press shots.

TABLE 6

| Number of press shots | Preform of the present invention percent defects | Concavo-convex preform of Comparison 1 percent defects | Biconvex preform of Comparison 2 percent defects |
| --- | --- | --- | --- |
| 100 shots | 0% | 0% | 0% |
| 500 shots | 0% | 0% | 3% |
| 1000 shots | 0% | 2% | 6% |

As shown in Table 6, the preform for an optical element of the present invention generated no defectives in serial 1000 shots, while the biconvex preform already generated 3% defectives in 500 shots, and the convexo-concave preform generated defectives in 1000 shots. This is believed to be principally caused due to settlement of the preform in pressing.

As described hereinabove, the present invention is characterized by a preform for an optical element which is produced by receiving a molten glass heated to a predetermined temperature on a receiving mold and then pressing with an upper mold half disposed at an opposing position, and involves a specified relationship of the external diameter, depth, and height.

Use of the preform involving the specified relationship of the external diameter, depth, and height enables decrease in chips and cracks in precise press molding, and reduction of percent of generation of defective articles. In addition, because the amount of charge by the mold may be decreased, less deformation of the glass is achieved, and the lifetime of the mold can be extended. Accordingly, frequency of repairing the pressing mold may be reduced, and thus, an inexpensive preform for an optical element having a concave shape with favorable appearance and quality can be provided. Furthermore, because of a formed recession having a concave shape, settlement of the glass gob is satisfactory in mold press molding and less amount of deformation is attained, thereby leading to reduction in costs due to shortening of the press time period.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

The invention claimed is:

1. A preform comprising:
an almost circular shape having a predetermined diameter in top view,
a flattened semicircular shape having a downwardly convex curve and nearly horizontal straight line on an upper end side in side view such that a distance from a lowermost part of the convex curve to a straight line becomes a predetermined height of the flattened semicircular shape,
a concave face on a top surface, and
a convex face on a bottom face, wherein
the concave face on the top surface forms the lowermost part of the concave face at approximately a central position in almost circular shape in said top view; wherein said concave face has, at approximately the central position in almost circular shape in said top view,
ratio of the distance of from said lowermost part of the concave face to said straight line of said upper end side in said side view to said diameter of the almost circular shape in said top view is from 0.02 to 0.9;
ratio of the wall thickness of the preform that is a distance of from said lowermost part of the convex face to said lowermost part of the concave face in said side view to said diameter of the almost circular shape in said top view is from 0.2 to 0.9;
the convex face on the bottom face forms the lowermost part of the convex face at a central position of the bottom face corresponding to said approximately the central position;
the ratio of said height of said flattened semicircular shape to said diameter of the almost circular shape in said top view is from 0.2 to 0.9;
the predetermined diameter is no less than 5 mm and no greater than 20 mm; curvature radius1 is between 8 and 60 mm, curvature radius2 is between 6 to 20 mm and
the preform is in a hardenedstate; and
the preform is used for press molding to produce an optical glass element.

2. The preform according to claim 1 wherein said convex face has a ratio of the curvature radius in the vicinity of said lowermost part of the convex face to the curvature radius in the vicinity of said lowermost part of the concave face on said concave face being from 0.4 to 10.

3. A preform comprising:
an almost circular shape having a predetermined diameter in top view,
a concave face on both of a top surface and an under surface, wherein the concave face on the top surface forms a lowermost part of the concave face at approximately a central position in almost circular shape in said top view;
the concave face on a bottom face forms an uppermost part of the concave face at the central position of the under surface corresponding to said approximately the central position;
ratio of sum of a distance of from said lowermost part of the concave face to the upper end side on one concave face in said side view and a distance of from the uppermost part of the concave face to the lower end side on another concave face in the side view to the diameter of the almost circular shape in said top view is from 0.02 to 0.9;
ratio of wall thickness of the preform that is a distance of from said lowermost part of the concave face on one concave face to said uppermost part of the concave face on another concave face in said side view to the diameter of the almost circular shape in said top view is from 0.2 to 0.9; and
ratio of a height of a flattened elliptic shape in a side view to the diameter of the almost circular shape in the top view is from 0.1 to 0.9;
the predetermined diameter is no less than 5 mm and no greater than 20 mm; curvature radius1 is between 6 and 60 mm, curvature radius2 is between 6 to 60 mm; deg. 1 is 3 to 40° and deg. 2 is 3 to 40';
the preform is in a hardened state; and
the preform is used for press molding to produce an optical glass element.

4. The preform according to claim 3 wherein ratio of a curvature radius in the vicinity of said lowermost part of the concave face on one concave face in said side view to a curvature radius in a vicinity of said uppermost part of the concave face on another concave face in said side view is from 0.1 to 10.

* * * * *